United States Patent
Borchers et al.

(10) Patent No.: US 8,638,212 B2
(45) Date of Patent: Jan. 28, 2014

(54) METHOD AND DEVICE FOR IDENTIFICATION OF CORRELATIONS BETWEEN ALARM MESSAGES OR BETWEEN ALARM MESSAGES AND OPERATOR ACTIONS

(75) Inventors: Hans-Werner Borchers, Heidelberg (DE); Martin Hollender, Dossenheim (DE)

(73) Assignee: ABB Technology AG, Zürich (CH)

( * ) Notice: Subject to any disclaimer, the term of this patent is extended or adjusted under 35 U.S.C. 154(b) by 700 days.

(21) Appl. No.: 12/782,365

(22) Filed: May 18, 2010

(65) Prior Publication Data
US 2010/0289638 A1    Nov. 18, 2010

(30) Foreign Application Priority Data
May 18, 2009   (DE) .......................... 10 2009 021 774

(51) Int. Cl.
    *G08B 29/00*    (2006.01)
(52) U.S. Cl.
    USPC ............. 340/506; 340/691.6; 706/12; 706/47
(58) Field of Classification Search
    USPC .......................... 340/506, 511, 514–17, 6.1, 340/691.1–691.6; 706/11, 12, 47
    See application file for complete search history.

(56) References Cited

U.S. PATENT DOCUMENTS

| | | | |
|---|---|---|---|
| 5,388,189 A * | 2/1995 | Kung | 706/45 |
| 5,581,242 A * | 12/1996 | Arita et al. | 340/517 |
| 5,748,098 A * | 5/1998 | Grace | 340/3.41 |
| 6,124,790 A * | 9/2000 | Golov et al. | 340/508 |
| 6,239,699 B1 * | 5/2001 | Ronnen | 340/517 |
| 6,766,368 B1 | 7/2004 | Jakobson et al. | |
| 7,080,398 B1 * | 7/2006 | Wichelman et al. | 725/107 |
| 7,284,048 B2 * | 10/2007 | Jakobson et al. | 709/224 |
| 7,337,222 B1 * | 2/2008 | Du et al. | 709/223 |
| 7,680,753 B2 * | 3/2010 | Sudhindra et al. | 706/45 |
| 7,840,515 B2 * | 11/2010 | Ozdemir et al. | 706/47 |
| 8,041,799 B1 * | 10/2011 | Usery et al. | 709/223 |

(Continued)

FOREIGN PATENT DOCUMENTS

WO    WO 02/086750 A1    10/2002

OTHER PUBLICATIONS

German Search Report dated Feb. 8, 2010 (with English language translation of category of cited documents).

(Continued)

*Primary Examiner* — Eric M Blount
(74) *Attorney, Agent, or Firm* — Buchanan Ingersoll & Rooney PC

(57) ABSTRACT

The disclosure relates to a method and device for identification of correlations between alarm messages in an alarm system of a technical installation or a technical process and/or correlations between such alarm messages and operator actions, using a data processing device which has access to recorded historical data which relates to alarm messages and operator actions. The data processing device can use market basket analysis methods to deal with and analyze historical data, which occurs at defined intervals, as a market basket. Quality characteristics can be formed from a relationship between respective operator actions before and after an occurrence of a respective alarm message, and/or from correlations between alarm messages and operator actions, via the data processing device, which has access to the recorded historical data which relates to alarm messages and operator actions.

14 Claims, 3 Drawing Sheets

| APRIORI algorithm | ECLAT algorithm |
|---|---|
| A668 <- A667 A1453  (1.3, 95.4) | A667 A668 A1453  (1.5%) |
| A1453 <- A667 A668  (1.3, 91.8) | A417 A418 A415  (1.7%) |
|  | A558 A557 A221  (2.8%) |
| A415 <- A417 A418  (1.5, 93.4) | A77 A57 A56  (1.6%) |
| A418 <- A417 A415  (1.6, 90.5) | A13 A16 A15  (1.1%) |
|  | A47 A45 A46  (2.8%) |
| A56 <- A77 A57  (1.2, 83.0) | A19 A16 A15  (1.2%) |
|  | A41 A16 A15  (1.1%) |
| A221 <- A557 A558  (2.6, 99.1) | A28 A29 A15  (1.1%) |
| A558 <- A557 A221  (2.6, 97.6) | A28 A29 A16  (1.3%) |
| A557 <- A558 A221  (2.6, 97.1) | A28 A29 A75  (1.2%) |
|  | A28 A16 A15  (1.1%) |
| A46 <- A47 A45  (1.8, 93.8) | A29 A16 A15  (1.1%) |
| A45 <- A47 A46  (2.1, 81.3) | A73 A16 A15  (1.8%) |
|  | A56 A16 A15  (1.7%) |
| A15 <- A243 A16  (1.4, 72.8) | A243 A16 A15  (2.1%) |
| A16 <- A243 A15  (1.5, 70.6) | A75 A16 A15  (3.0%) |
|  |  |
| A16 <- A75 A15  (2.0, 76.0) |  |

(56) References Cited

U.S. PATENT DOCUMENTS

| | | |
|---|---|---|
| 2003/0097367 A1* | 5/2003 | Ma et al. ............... 707/102 |
| 2008/0201277 A1 | 8/2008 | Ozdemir et al. |
| 2010/0102982 A1* | 4/2010 | Hoveida .................. 340/691.3 |

OTHER PUBLICATIONS

European Search Report dated Nov. 18, 2011 in corresponding European Patent Application No. 10162747.9.

Sizu Hou et al, "Analysis and Research for Network Management Alarms Correlation Based on Sequence Clustering Algorithm", 2008 International Conference on Intelligent Computation Technology and Automation (ICICTA), Oct. 10, 2008, pp. 982-986, XP031354404, ISBN: 978-0-7695-3357-5, Piscataway, NJ, USA.

Mahanti A et al, "Visual Interface for Online Watching of Frequent Itemset Generation in Apriori and Eclat", Machine Learning and Applications, Proceeding, Fourth International Conference, Dec. 15, 2005, pp. 404-410, XP010902795, ISBN 978-0-7695-2495-5, Los Angeles, CA, USA.

Dr. Kurtz Hans, "Alarmmanagement-Ziele, Erfahrungen, Nutzen", ATP Automatisierungstechnische Praxis, Bd., Feb. 28, 2008, pp. 86-90, XP002663028.

* cited by examiner

| APRIORI algorithm | ECLAT algorithm |
|---|---|
| A668 <- A667 A1453 (1.3, 95.4) | A667 A668 A1453 (1.5%) |
| A1453 <- A667 A668 (1.3, 91.8) | A417 A418 A415 (1.7%) |
| | A558 A557 A221 (2.8%) |
| A415 <- A417 A418 (1.5, 93.4) | A77 A57 A56 (1.6%) |
| A418 <- A417 A415 (1.6, 90.5) | A13 A16 A15 (1.1%) |
| | A47 A45 A46 (2.8%) |
| A56 <- A77 A57 (1.2, 83.0) | A19 A16 A15 (1.2%) |
| | A41 A16 A15 (1.1%) |
| A221 <- A557 A558 (2.6, 99.1) | A28 A29 A15 (1.1%) |
| A558 <- A557 A221 (2.6, 97.6) | A28 A29 A16 (1.3%) |
| A557 <- A558 A221 (2.6, 97.1) | A28 A29 A75 (1.2%) |
| | A28 A16 A15 (1.1%) |
| A46 <- A47 A45 (1.8, 93.8) | A29 A16 A15 (1.1%) |
| A45 <- A47 A46 (2.1, 81.3) | A73 A16 A15 (1.8%) |
| | A56 A16 A15 (1.7%) |
| A15 <- A243 A16 (1.4, 72.8) | A243 A16 A15 (2.1%) |
| A16 <- A243 A15 (1.5, 70.6) | A75 A16 A15 (3.0%) |
| A16 <- A75 A15 (2.0, 76.0) | |

Fig. 1

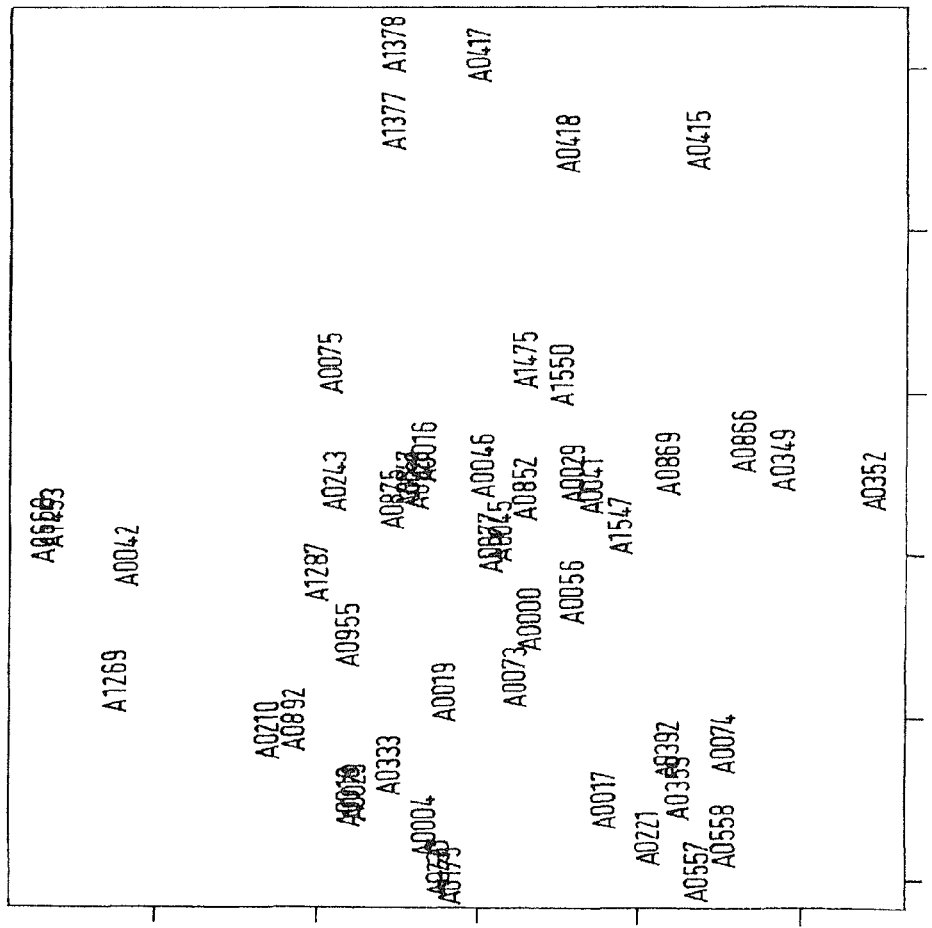

METHOD AND DEVICE FOR IDENTIFICATION OF CORRELATIONS BETWEEN ALARM MESSAGES OR BETWEEN ALARM MESSAGES AND OPERATOR ACTIONS

RELATED APPLICATIONS

This application claims priority under 35 U.S.C. §119 to German Patent Application No. 102009021774.6 filed in Germany on May 18, 2009, the entire content of which is hereby incorporated by reference in its entirety.

FIELD

The disclosure relates to a method and a device for identification of correlations between alarm messages in an alarm system of a technical installation or a technical process, and/or correlations between such alarm messages and operator actions.

BACKGROUND INFORMATION

Alarm systems are major devices of monitoring systems or control systems of technical installations, for example power stations or production installations, and they are important aids for the operating personnel, in order to identify installation or process states which involve immediate action. The method of operation of the alarm systems for determining and displaying installation or process states is governed by alarm messages, that is to say for example by defined—for the purposes of alarm configuration—limit values of process variables. These alarm messages are made available to the operators of the installations in many different ways.

Since both individual components and subsystems of a control system are designed to generate alarms, that is to say a large number of alarms may occur, alarm systems are designed to operate effectively. They are intended to make operating personnel aware of dangerous situations, and to propose steps to avoid or overcome danger situations. Steps such as these are intended to return the respective process to normal operation. If too many alarms are generated during serious situations, the operator may possibly be confused, and alarms which are actually important may remain unidentified or ignored in the flood of alarms. This situation has been known, as well as many efforts to optimize alarm systems.

For example, commercial alarm analysis packets are known for generating KPIs (Key Performance Indicators) by analysis of recorded historical data, and these can help to optimize alarm systems. For example, such analyses can be used to determine very frequent alarms from historical recordings, as well as intermittent alarms, which occur frequently at very short time intervals, or else simple correlations, in which case the number of times that two alarms occur together at short intervals is counted.

When alarm systems are being designed or revised, the configuration process can be carried out manually, under the basis of process knowledge and simple statistics. However, in this case, the options to use the experience of operating personnel or knowledge from stored alarm events can be very limited. Continuous improvement efforts are directed to reducing the number of alarms, for example in serious situations as well, for example below the limits recommended by the EEMUA (Engineering Equipment and Materials Users' Association). It is self-evident that major alarms should not be suppressed.

SUMMARY

A method is disclosed for identification of correlations between alarm messages in an alarm system of a technical installation or a technical process and/or correlations between such alarm messages and operator actions, which has access to alarm messages and recorded historical data which relates to operator actions, using a data processing device, comprising analyzing via a market basket analysis method, historical data relating to alarm messages and operator action, which occurs at defined intervals, as a market basket; and forming a quality characteristic from a relationship between respective operator actions before and after an occurrence of a respective alarm message, and/or from a correlation between alarm messages and operator actions, using a data processing device which has access to the historical data.

A device is disclosed for identification of correlations between alarm messages in an alarm system of a technical installation or a technical process and/or correlations between such alarm messages and operator actions, which has access to alarm messages and recorded historical data which relates to operator actions, comprising: a data processing device which contains hardware and software means for carrying out analyses and calculations to determine correlations between alarm messages received via a data processing device input from an alarm system of a technical installation or a technical process and/or correlations between such alarm messages and operator actions, wherein the data processing device performs functions of a) accessing recorded historical data which relates to alarm messages and operator actions; b) performing market basket analysis of the historical data, at defined intervals, as a market basket; and/or c) determining a quality characteristic based on characteristic calculated correlations between operator actions and alarm messages as a measure of an extent to which an alarm message initiates a operator action.

BRIEF DESCRIPTION OF THE DRAWINGS

The description of the exemplary embodiments and advantages of exemplary embodiments, as well as refinements thereof, will be described in the following text with reference to the drawing figures, in which:

FIG. 1 shows examples of analysis results, both for use of the APRIORI algorithm and for use of the ECLAT algorithm, for analysis of historical alarm messages;

FIG. 3 shows, by way of example, a visualization of a proximity of alarms.

DETAILED DESCRIPTION

Figure 2:
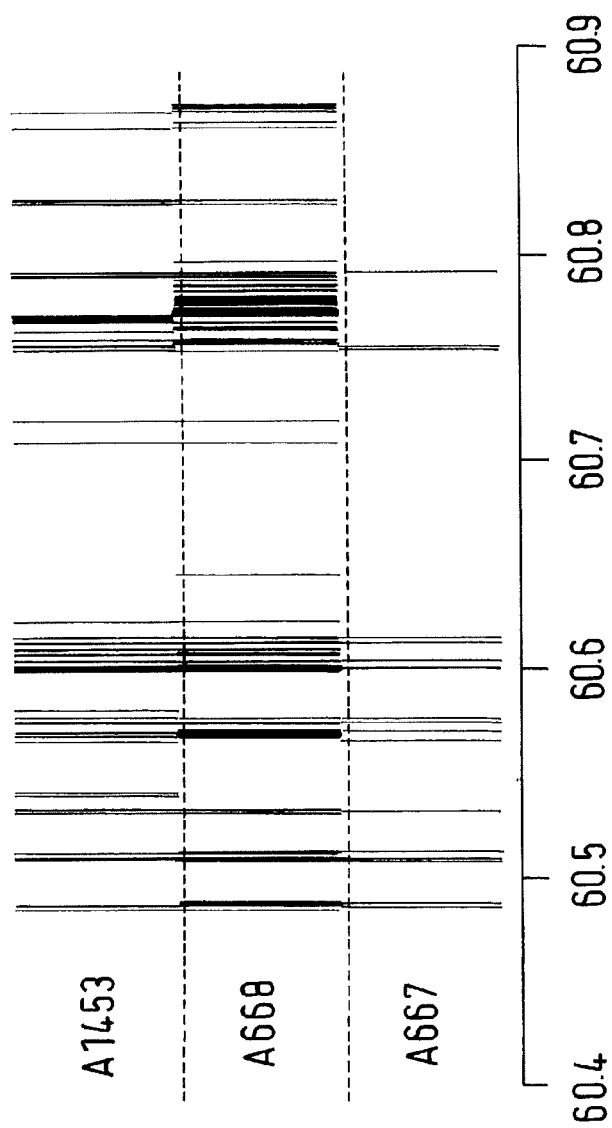
FIG. 2 shows an exemplary specific visualization relating to an investigation of relationships between alarms.

A method and a device suitable for carrying out the method are disclosed which make it possible to achieve a reduction in the number of alarms from measured values, process variables and/or state messages in a technical installation or a technical process, by better use of experience from previous alarm events and process states, for the configuration of alarm systems.

An exemplary method is disclosed for identification of relationships, also referred to as correlations, between alarm messages in an alarm system of a technical installation or a technical process and/or relationships between such alarm messages and operator actions.

A data processing device can be used, which has access to recorded historical data which relates to alarm messages and operator actions, to deal with and to analyze historical data, which occurs at defined time intervals, as a market basket, using market basket analysis methods, and/or to form quality characteristics from the relationship between the respective operator actions before and after the occurrence of the respective alarm message, from correlations between alarm messages and operator actions, by means of the data processing device, which has access to recorded historical data which relates to alarm messages and operator actions.

An exemplary device according to the disclosure includes a data processing device which contains hardware and software means for carrying out analyses and calculations in order to determine correlations between alarm messages in an alarm system of a technical installation or a technical process and/or correlations between such alarm messages and operator actions, wherein the data processing device:

a) has access to recorded historical data which relates to alarm messages and operator actions,
b) uses market basket analysis methods to deal with and analyze historical data, which occurs at defined intervals, as a market basket, and/or
c) on the basis of the results of calculated correlations between operator actions and alarm messages, determines quality characteristics which are a measure of the extent to which an alarm message initiates a operator action.

The data processing device can also display the results of the analyses and calculations by means of a display apparatus.

According to exemplary embodiments, alarms to be configured can be reduced considerably if those alarms and alarm sequences which very frequently appear together are found from the historical alarm recordings. If tens of thousands of alarm messages occur every month, it is difficult to carry out analyses such as these by standard procedures and search methods, since the investigation area grows exponentially. For example, it is found that Alarm 1, Alarm 2 and Alarm 3 always occur together, one could consider not displaying two of them, since they have no additional value for an operator. It could also be expedient to display Alarm 3 only if Alarm 1 and Alarm 2 have not previously occurred.

By way of example, the problem and solution techniques for finding millions of recorded purchasing occurrences of those products which are frequently purchased together by customers in a supermarket are known from the fields of application of data mining. Methods used for this purpose are known as "association mining" or "market basket analysis" (market basket analysis).

However, market basket analysis involves closed units which occur in the case of the amounts of products in a respective market basket. According to an exemplary embodiment, in a first exemplary step, data streams which are recorded over a long period and relate to events and alarms are subdivided to create data sets of specific time periods for analysis. Successful analysis trials have been carried out with data in time periods which can be formed in various exemplary ways: according to a variant a, data was used in non-overlapping, defined intervals of, for example, 5 to 20 minutes in duration. A variant b operates with overlapping intervals of a fixed length, in each case starting with the occurrence of a recorded alarm. A variant c uses intervals of different length, with the interval containing at least one specific set of alarms. Other variants are of course possible.

Alarms in each of these intervals can be dealt with as a type of market basket using algorithms from so-called association mining, for example the APRIORI algorithm or ECLAT algorithm.

FIG. 1 shows examples of analysis results as a table, both for use of the APRIORI algorithm and for use of the ECLAT algorithm for analysis of historical alarm messages, wherein several thousand alarms were investigated from a two-month period. The following rule is used to explain how the result lines should be interpreted:

$$A668 \leftarrow A667\ A1453\ (1.3, 95.4)$$

The alarms A668, A667 and A1453 appear together in 1.3% of the analyzed interval, and A668 also occurs in 95.4% of the interval in which A667 and A1453 appear. While simultaneous appearance of A667 and A668 may be natural, the result explained by way of example is rather surprising and can be used for further analysis relating to alarm A1453.

In a second exemplary step, a specific visualization, illustrated in FIG. 2, can be used to investigate relationships between the alarms. In this case, a section from the two-month period on which FIG. 1 is also based is illustrated. In the original, the visualization shown in FIG. 2 is a colored illustration, which can be seen more clearly. The occurrence of the alarms A667, A668, and A1453 in the time period under consideration is shown, from which the joint appearance of these alarms is apparent. Without using a procedure such as that described herein, it would be virtually impossible to identify such regular relationships from thousands of alarms. The visualization shows only the three alarms of interest here, and is based on results from the previous statistical analysis.

In FIG. 2, for each alarm involved in a rule (here A667, 668 and 1453), its occurrence in a time period (in this case the 61st observation day) is displayed by a vertical bar for the given time, with a strip parallel to the time axis being associated with each alarm, in order in this way to illustrate the occurrence and times close to one another. Each vertical bar is shown in a semi-transparent form, such that the color is more clearly evident when the same alarm occurs frequently at very short time intervals.

As a possible exemplary third step, specific time regions can be marked in the visualization shown in FIG. 2, for example by interactively drawing a rectangle by means of a cursor. The image can then be magnified, also referred to as zooming, onto this time period, and the alarms A667, A668, and A1453 can be emphasized in a bold form in an alarm list which is displayed at the same time and contains all the alarms in the time period under consideration.

Alarm suppression rules can be formulated on the basis of the knowledge obtained in this way about the relationships between alarm messages or between alarm messages and operator actions, which alarm suppression rules can be used to reduce the number of future alarm messages, in the course of modification of an alarm configuration. For example, one such rule could be: suppress Alarm C when Alarm A and Alarm B have occurred shortly before.

Before such rules are applied, their effects can be checked on the basis of recorded historical alarm messages and by means of a processor implementing a so-called "what-if" analyses. A check such as this makes it possible to tell clearly and safely what the effect of such rules would be if they had already been used previously. For example, the already mentioned KPIs, as proposed according to EEMUA191, can be calculated in order to find out what improvement the rules formed would have resulted in the case of the historical alarm messages.

When alarms appear in alarm suppression rules, this defines a certain proximity of the alarms. This makes it possible to also use other multivariate statistical methods, thus making it possible to investigate the dependency structure of a plurality of alarms. The starting point in this case is the same data structure which was also used for generation of the association rules.

By way of example, FIG. 3 shows a visualization of the proximity of alarms. A representation of alarms such as this is the result of use of multidimensional scaling (MDS) methods. Multidimensional scaling indicates a more comprehensive dependency of alarms than simply a relationship of two alarms; this also results in a relationship between alarms and other alarms which appear in other rules. A layout such as this can be used to define bundles of alarms which can be combined to form groups, or, for example, at least to modify alarm priorities.

Depending on the process or installation, it can also be expedient to consider not only the correlation between different alarms but also the correlation between alarms and operator actions. If alarms follow operator actions, then this can indicate an error by the installation operator. However, it may also be the case that the alarm is incorrectly configured and arrives so late that the necessary operator actions would already have been previously obvious. If operator actions follow alarms with high probability, then this indicates that these are well-configured alarms.

These correlations can be calculated by the already described market basket analysis, by each market basket containing both alarms and operator actions. The correlation between operator actions and alarms should be displayed for operators and control engineers. The correlation values (as in the rules mentioned above) can be regarded as quality characteristics for individual alarms.

According to an exemplary advantageous refinement, additional quality characteristics can be associated with each alarm, for example the average number of occurrences in a specific interval before and after an alarm, as well as an average number which indicates how often an alarm has occurred, for example in one week or in one month.

A quality characteristic of the alarms linked to subsequent operator actions can be configured as follows:
   0 indicates that an alarm has no importance for the installation operator,
   1 indicates that each alarm is important for the operator, that is to say a operator action always follows an alarm,
   a value between 0 and 1 indicates that the alarm was sometimes followed by operator actions, but sometimes also not.

In theory, every alarm should initiate at least one operator action. A further exemplary refinement allows historical data to be used as the basis for determining the extent to which an alarm has initiated a operator action. This is based on a list of alarms with time stamps, as well as a corresponding list with operator actions. The following exemplary steps are suitable for this purpose:
   1. Initial filtering:
      One event should be counted only once in one interval. If an alarm has been initiated more than once in a short time, only the first alarm is counted. In the case of operator actions, it is possible, for example, for a nominal value to be set in a plurality of small control steps which quickly follow one another. Such operator actions are also counted only once per interval (for example, 5 or 10 minutes or any desired interval).
   2. Calculation of the quality characteristic:
      If an alarm has no effect, this means that a similar number of operator actions have been taken before the alarm as after the alarm,
      if an alarm initiates operator actions, then more actions can be found after the alarm than before the alarm.

Operator actions can be counted for a specific interval (for example 10 minutes or other suitable interval) before and after each alarm. One option is to weight the operations depending on the separation from the alarm, for example using $\exp(-a*t)$, with a suitably chosen constant a. Appropriate initial filtering is in this case desirable. If the operator action is not preceded by an alarm message, the value is set to 0.1.
   If d1 and d2 are weighted numbers of alarms before and after the operator action, a suitable transformation can be used to form a quality value. One example will be a sigmoid function. This is the expression $1/(+\exp(1-d))$ if $d>=1$ and $0.5*d$ otherwise, where $d=d2/d1$. Other forms of expression are possible if a greater or lesser influence is desired on the quality value.
   3. Use of the quality characteristic to improve the man-machine interface:
   a. Removal of alarms with a low quality characteristic. Such alarms should be checked by a control engineer, and should be removed if appropriate. The quality characteristic helps control engineers to concentrate on weaknesses, thus speeding up the configuration modification process in comparison to checking all the configured alarms.
   b. Direct display of the quality characteristic as information for the operator.
   c. Emphasis of alarms/signals with a high quality characteristic. Examples by:
      i. Displaying a specific alarm list which contains only alarms with a high quality characteristic,
      ii. Producing a specific acoustic signal when an alarm such as this occurs, and
      iii. A specific display, which indicates trends for the most important alarms, or emphasizes the relevant signals in a bulk data display.

An exemplary data processing device for carrying out the methods disclosed herein can include hardware and software means for carrying out the explained analyses and calculations, as well as for displaying results and for carrying out a check of the effect of the rules which have been formed on the basis of the knowledge from analysis results.

The data processing device has access to recorded historical data which relates to alarm messages and operator actions, and the data processing device can use market basket analysis methods to deal with and to analyze historical data, which occurs at defined intervals, as a market basket, and/or to determine quality characteristics, which are a measure of how many times an alarm message initiates a operator action, on the basis of results from calculated correlations between operator actions and alarm messages.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for identification of correlations between alarm messages in an alarm system of a technical installation or a technical process and/or correlations between such alarm messages and operator actions, which has access to alarm messages and recorded historical data which relates to operator actions, using a data processing device, comprising:

analyzing via a market basket analysis method, historical data relating to alarm messages and operator action, which occurs at defined intervals, as a market basket;

forming a quality characteristic from a relationship between respective operator actions before and after an occurrence of a respective alarm message, and/or from a correlation between alarm messages and operator actions, using a data processing device which has access to the historical data;

defining alarm suppression rules based on results of the analyzing; and performing a program-controlled check of effects of the rules by having the data processing device check what effects the rules would have had in reducing a number of the alarm messages included in the historical data.

2. Method according to claim 1, comprising:
displaying results of the analyzing.

3. Method according to claim 1, comprising:
forming the intervals by subdividing the historical data into periods of a fixed duration which each start with a recorded alarm.

4. Method according to claim 1, wherein the analyzing is performed via an APRIORI-algorithm or an ECLAT-algorithm.

5. Method according to claim 1, comprising:
determining the characteristics based on results from determined correlations between operator actions and alarm a messages, the quality characteristics being a measure of an extent to which an alarm message initiates a operator action.

6. Method according to claim 1, comprising:
forming a quality characteristic by:
filtering of the historical data, wherein alarm messages which occur in a defined interval are counted as one alarm message and operator actions which occur in a defined interval are counted as one operator action; and
calculating a quality characteristic which depends on whether an alarm message initiates an operator action.

7. Device for identification of correlations between alarm messages in an alarm system of a technical installation or a technical process and/or correlations between such alarm messages and operator actions, which has access to alarm messages and recorded historical data which relates to operator actions, comprising:

a data processing device which contains hardware and software means for carrying out analyses and calculations to determine correlations between alarm messages received via a data processing device input from an alarm system of a technical installation or a technical process and/or correlations between such alarm messages and operator actions, wherein the data processing device performs functions of:

accessing recorded historical data which relates to alarm messages and operator actions;

performing market basket analysis of the historical data, at defined intervals, as a market basket;

determining a quality characteristic based on characteristic calculated correlations between operator actions and alarm messages as a measure of an extent to which an alarm message initiates an operator action;

defining alarm suppression rules based on results of the analyses and calculations; and performing a program-controlled check of effects of the rules by having the data processing device check what effects the rules would have had in reducing a number of the alarm messages included in the historical data.

8. Method according to claim 1, comprising:
forming the intervals by subdividing the historical data into periods of a variable duration which each include a fixed number of alarm messages.

9. Device according to claim 7, wherein the analyzing is performed via an APRIORI-algorithm or an ECLAT-algorithm.

10. Device according to claim 7 wherein the data processing device performs functions of:
displaying results of the analyzing.

11. Device according to claim 7 wherein the data processing device performs functions of:
forming the intervals by subdividing the historical data into periods of a fixed duration which each start with a recorded alarm.

12. Device according to claim 7 wherein the data processing device performs functions of:
determining the characteristics based on results from determined correlations between operator actions and alarm a messages, the quality characteristics being a measure of an extent to which an alarm message initiates a operator.

13. Device according to claim 7 wherein the data processing device performs functions of:
forming a quality characteristic by:
filtering of the historical data, wherein alarm messages which occur in a defined interval are counted as one alarm message and operator actions which occur in a defined interval are counted as one operator action; and
calculating a quality characteristic which depends on whether an alarm message initiates an operator action.

14. Device according to claim 7 wherein the data processing device performs functions of:
forming the intervals by subdividing the historical data into periods of a variable duration which each include a fixed number of alarm messages.

* * * * *